US005590377A

United States Patent [19]
Smith

[11] Patent Number: 5,590,377
[45] Date of Patent: Dec. 31, 1996

[54] AUTOMATIC CONTROL OF DISTRIBUTED DMAS IN A PCI BUS SYSTEM SUPPORTING DUAL ISA BUSES

[75] Inventor: Michael G. Smith, Tustin, Calif.

[73] Assignee: AST Research, Inc., Irvine, Calif.

[21] Appl. No.: 481,121

[22] Filed: Jun. 7, 1995

[51] Int. Cl.⁶ .................................................. G06F 13/00
[52] U.S. Cl. .................... 395/842; 395/200.07; 395/427; 395/848; 364/242.33; 364/DIG. 1
[58] Field of Search ..................................... 395/427, 842, 395/848, 200.07, 200.08; 364/242.33

[56] References Cited

U.S. PATENT DOCUMENTS

| 4,067,059 | 1/1978 | Derchak | 395/848 |
|---|---|---|---|
| 4,831,523 | 5/1989 | Lewis et al. | 395/848 |
| 5,212,795 | 5/1993 | Hendry | 395/725 |
| 5,420,696 | 5/1995 | Wegeng et al. | 358/408 |
| 5,450,551 | 9/1995 | Amini et al. | 395/299 |
| 5,465,332 | 11/1995 | Deloye et al. | 395/842 |
| 5,485,624 | 1/1996 | Steinmetz et al. | 395/775 |

OTHER PUBLICATIONS

David Dickens, "PCI1130 DMA Overview," *PCIbus Solutions*, Rev. 1.1, Texas Instruments, Jan. 16, 1995, pp. 1–15.
David Dickens, "PCI1130 Power Management Overview," *PCIbus Solutions*, Rev. 1.2, Texas Instruments, Jan. 16, 1995, pp. 1–7.
David Dickens, "PCI1130 Interrupt Overview," *PCIbus Solutions*, Rev. 1.0, Texas Instruments, Jan. 24, 1995, pp. 1–6.
PCI Local Bus Specification, Production Version, Rev. 2.0, PCI Special Interest Group, Apr. 30, 1993, pp. i–x, 1–198.
PCI to PCI Bridge Architecture Specification, Rev. 1.0, PCI Special Interest Group, Apr. 5, 1994, pp. i–iii, 1–66.

*Primary Examiner*—Frank J. Asta
*Attorney, Agent, or Firm*—Knobbe, Martens, Olson & Bear

[57] ABSTRACT

A distributed direct memory access (DMA) system includes specially configured hardware connections between at least one slave DMA controller and a central, or master, DMA controller. The specially configured hardware connections allow the slave DMA controllers to request channel configuration information from the central DMA controller when peripheral devices under the control of the slave DMA controllers make a DMA request. After the channel information is transferred from the master DMA controller to the slave DMA controller, the slave DMA controller is able to process DMA requests for the peripheral devices under its control. In one particular embodiment, the master DMA controller is located in a notebook computer and the slave DMA controller is located in a docking station. The master DMA controller and slave DMA controller communicate when the notebook computer is engaged with the docking station.

7 Claims, 7 Drawing Sheets

AUTOMATIC CONTROL OF DISTRIBUTED DMAS IN A PCI BUS SYSTEM SUPPORTING DUAL ISA BUSES

BACKGROUND OF THE INVENTION

1. Field of the Invention

The present invention relates to computer systems including direct memory access (DMA) controllers, and in particular, to portable computer systems compatible with docking stations having controllers capable of providing DMA.

2. Description of the Related Art

Computer systems having direct memory access (DMA) allow input/output (I/O) units to access memory (e.g., such as a dynamic random access memory (DRAM)) via a DMA controller rather than through a microprocessor. The DMA controller includes logic, timers, registers, etc., which allow the I/O unit to directly access memory circuits within the computer system. Memory accesses made via a DMA controller are typically much faster than memory accesses made via the microprocessor.

Typically, when an I/O device initiates an access to a memory via a DMA controller, the I/O device issues a DMA request to the DMA controller, and, subsequently, receives a DMA acknowledge signal from the DMA controller if the memory is available to be accessed by the I/O device. Once the DMA controller has acknowledged the DMA request, the I/O unit begins to transfer data under control by the DMA controller. The DMA controller manages the transfer of this data between the I/O unit and the memory in a manner similar to a conventional bus master on the system bus.

Within a DMA controller a plurality of registers are assigned to separate channels under the control of the DMA controller. That is, the registers store address data associated with a hardware configured channel within the computer system. Each channel corresponds to an I/O device which uses the DMA controller. Specifically, the registers within the DMA controller contain address and control information which are specifically assigned to the I/O devices which use the DMA controller. Furthermore, these registers are assigned a prespecified channel number which corresponds to hardware-configured channel numbers in each I/O device. Thus, for example, a disk drive storage system may have a hardware-configured channel number of 4, corresponding to selected address and control information stored within registers in the DMA controller, while a sound (audio) board or other I/O device has a hardware-configured channel number of 7, which corresponds to other specified address and control information stored within registers of the DMA controller.

Although DMA is widely used in the PC-AT architecture, the PCI bus architecture does not support DMA from a central DMA control unit. This is because the PCI bus allows for only a single agent to operate on the bus at one time. Thus, since a central DMA controller typically operates (within the PC-AT architecture) by supplying address and request information to a target, while another device (e.g., an I/O unit) supplies the data to the target independent of the DMA controller, two agents would operate on the bus at the same time. Since the PCI bus architecture does not allow one device to send address and command signals over the bus while another device sends data signals over the bus, some systems have provided for the use of slave DMA controllers in addition to a central DMA controller. A slave DMA controller is local to the agent which is to transfer data over the PCI bus, and controls the transmission of data to the target on the PCI bus so that the slave controller is the only agent which the PCI bus sees. However, it has been found that the provision of multiple DMA controllers (i.e., a central DMA controller and one or more slave DMA controllers) on the PCI bus results in a further difficulty.

As long as there is a single central DMA controller within a given computer system which receives channel assignments for each of the I/O units within the computer system, this central DMA controller is able to provide direct memory accesses for each of the I/O units configured to operate in the computer system. However, as discussed above, multiple DMA controllers may be necessary in certain applications such as when DMA is provided on a PCI bus. Furthermore, in other applications, for example, a notebook computer is connected to a docking station having DMA capability for one or more I/O devices associated with the docking station. Under certain circumstances, a slave DMA controller within the notebook computer or the docking station may not receive information indicating the assignment of a particular DMA channel to an I/O device in the docking station. This may happen because operating system software within the computer system is typically not capable of distinguishing among multiple DMA controllers. Thus, all hardware configured I/O channels within the computer system are usually assigned to the central DMA controller. Since the central DMA controller hardware within the computer system is not informed about which channels are to be assigned to which DMA controllers, the central DMA controller is not capable of setting the appropriate DMA channels on the slave controllers.

In such a configuration, I/O units which have DMA capability under the control of one of the slave DMA controllers would not be able to employ DMA without highly specialized software (e.g., software which discriminates amongst multiple DMA controllers and all I/O devices associated with each of the controllers). For example, in certain docking systems, a notebook computer connects with the docking station via a PCI bridge so that a PCI bus within the notebook computer is in communication with a PCI bus within the docking station. The docking station further includes an industry-standard architecture (ISA) bus in communication with the PCI bus within the docking station. In such systems, I/O units mounted in ISA expansion slots on the ISA bus within the docking station are not under the control of the central DMA controller within the notebook computer. Rather the I/O units in the ISA expansion slots communicate with the devices on the PCI bus via a PCI-to-ISA bridge associated with a slave DMA controller. This happens because the PCI and ISA busses are incompatible and therefore require some kind of interface. Furthermore, the PCI bus does not support DMA from the ISA bus in the docking station. Thus, the central DMA controller within the notebook computer does not receive DMA requests from the particular channels assigned to the I/O devices connected on the ISA bus within the docking station.

In such systems, the slave DMA controller, which is the only DMA controller able to control the I/O units on the ISA bus, does not receive the necessary configuration information to allocate a channel to the I/O units on the ISA bus. The reason for this is that the allocation software is typically not sophisticated enough to detect the presence of the slave DMA controller. Thus, the slave DMA controller may simply ignore DMA requests from the I/O units on the ISA bus. Consequently, the DMA capability may not operate correctly in a notebook computer using a central DMA controller engaged with a docking station, as described above.

SUMMARY OF THE INVENTION

A microprocessor-based computer system provides distributed direct memory access (DMA) for a plurality of peripheral units. The computer system comprises a memory and a central DMA controller in communication with the memory via a system bus. The central DMA controller includes registers which store data defining a communication channel associated with one of the peripheral units. The computer system further includes a slave DMA controller in communication with the memory and the central DMA controller via the system bus. The slave DMA controller includes registers for storing data defining the communication channel. A plurality of the peripheral units are configured to access the memory, some of the peripheral units are in communication with the memory via the central DMA controller and others of the peripheral units are in communication with the memory via the slave DMA controller. The peripheral units are further configured to include an assigned communication channel. Finally, the computer system includes a hardware connection between the slave DMA controller and the central DMA controller which allows the slave DMA controller to request channel information in the registers within the central DMA controller when one of the peripheral units in communication with the memory via the slave DMA controller initiates a memory access.

In a preferred embodiment, the slave DMA controller includes a state machine which initiates the request of channel information and the central DMA controller includes a state machine which receives the request of channel information and initiates transfer of the channel information to the slave DMA controller.

According to a further aspect, the invention is a method of automatically controlling distributed direct memory accesses (DMAs) in a distributed DMA computer system including a memory, a central DMA controller, a slave DMA controller, and a plurality of peripheral units. The peripheral units have hardware configured channel data defining communication channels associated with each of the peripheral units. The method includes the steps of configuring the central DMA controller to control direct memory accesses initiated by the peripheral units by storing information in the central DMA controller corresponding to the hardware configured channel data within the peripheral units; initiating a DMA request from one of the peripheral units to the slave controller; requesting, from the central DMA controller, channel data corresponding to a communication channel associated with the one of the peripheral units; and transferring the channel data corresponding to the communication channel associated with the one of the peripheral units from the central DMA controller to the slave DMA controller.

In a preferred embodiment, the method further comprises the step of masking the channel data corresponding to the communication channel so that the central DMA controller is no longer enabled to control DMA accesses initiated by the peripheral unit associated with the communication channel.

In another preferred embodiment, the method further comprises the step of acknowledging the DMA request and controlling memory transfer between the requesting peripheral unit and the memory.

Under a further aspect of the invention, a computer system for automatically controlling direct memory accesses (DMAs) comprises a microprocessor; a memory under the control of the microprocessor; a system bus; and a central DMA controller in communication with the memory via the system bus. The central DMA controller stores configuration information which provides for control of direct accesses to the memory for selected devices in communication with the system bus. The computer system additionally includes a slave DMA controller in communication with the system bus where the slave DMA controller is also in communication with the central DMA controller via another hardware connection, and where the hardware connection provides data to the central DMA controller which designates selected portions of the configuration information which are to be transferred to the slave DMA controller; and a peripheral unit in communication with the memory via the slave DMA controller and the system bus.

Yet another aspect of the invention is a computer system for automatically controlling direct memory accesses (DMAs) comprising a notebook computer. The notebook computer comprises a microprocessor; a memory under the control of the microprocessor; a system bus; a central DMA controller in communication with the memory via the system bus, where the central DMA controller stores configuration information which provides for control of direct accesses to the memory for selected devices in communication with the system bus; and a peripheral unit which accesses the memory via the central DMA controller. The computer system also includes a docking station which communicates with the notebook computer via a connector. The docking station comprises a slave DMA controller in communication with the system bus via the connector where the slave DMA controller is also in communication with the central DMA controller via a hardware connection, and where the hardware connection provides data to the central DMA controller which designates selected portions of the configuration information which is to be transferred to the slave DMA controller; and a peripheral unit in communication with the memory via the slave DMA controller and the system bus.

DETAILED DESCRIPTION OF THE PREFERRED EMBODIMENT

Figure 1:
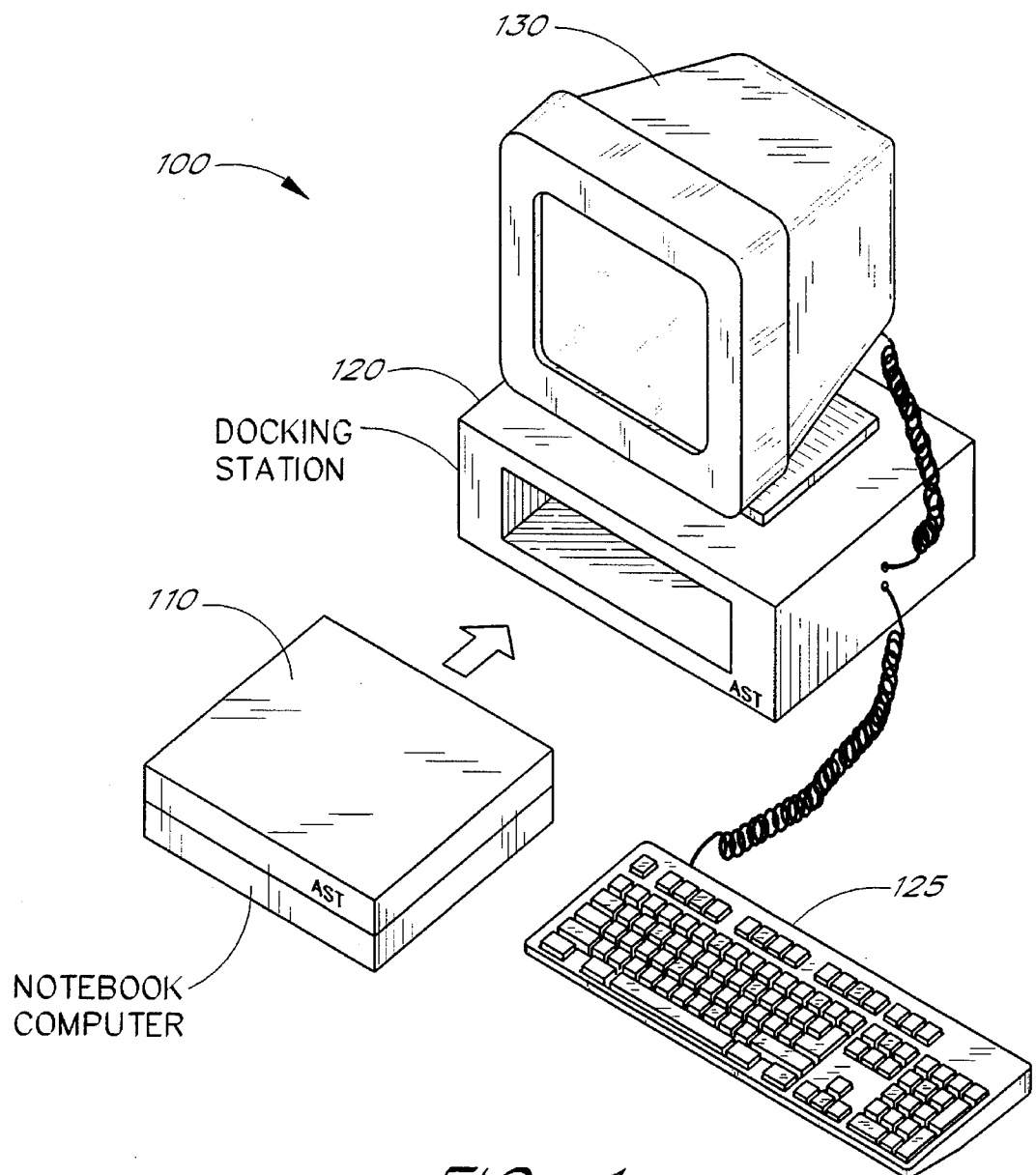
FIG. 1 is a perspective view showing the physical layout of a docking station which receives a notebook computer.

FIG. 1 is a perspective view of a PCI notebook/docking station system 100 which shows a notebook computer 110 prepared for engagement with a docking station 120 via an engagement slot 125 within the docking station. Typically, docking stations are used to provide full-sized peripherals and/or additional expansion capability to a notebook computer. For instance, as depicted in FIG. 1, the docking station 120 includes peripheral connections to a full-sized keyboard 125 and a full-sized monitor 130. As represented by an arrow in FIG. 1, the notebook computer 110, which, in one embodiment, comprises an AST ASCENTIA notebook computer, slides into the engagement slot 125 and electrically connects to circuitry within the docking station 120 via a connector (not shown in FIG. 1).

Once the notebook computer 110 is engaged within the docking station 120, a user may operate the notebook computer 110 using the peripheral devices, such as the keyboard 125 and the display 130, via the circuitry within the docking station 120. The docking station 120 may also include additional peripheral devices such as a hard disk drive, a printer, etc. (not shown).

Figure 2:
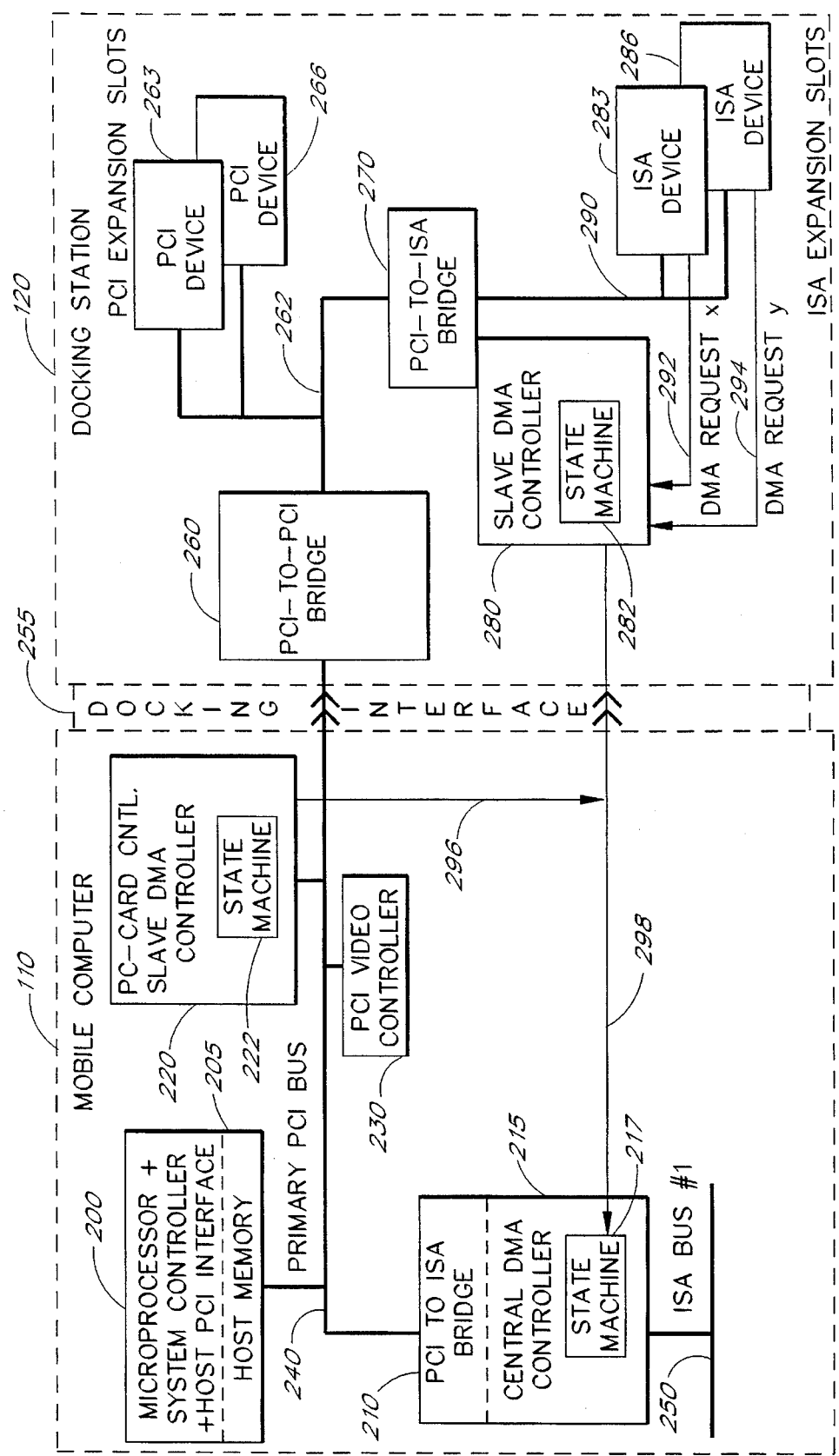
FIG. 2 is a simplified schematic block diagram which depicts the main functional elements internal to the notebook computer and docking station of FIG. 1.

FIG. 2 is a simplified schematic block diagram which illustrates the PCI notebook/docking station architecture internal to the notebook computer 110 and the docking station 120. The notebook computer 110 (enclosed within a dashed line in FIG. 2) includes a microprocessor, system controller, and PCI interface, designated generally by the reference number 200, in communication with a memory 205. In one preferred embodiment, the microprocessor comprises a PENTIUM microprocessor chip available from INTEL while the memory 205 is preferably implemented as a DRAM which stores 4–8 megabytes of data. The microprocessor 200 and the memory 205 have access to a PCI-to-ISA bridge 210, including a central (also known as a "master") DMA controller 215, via a primary PCI bus 240. The PCI bus 240 is preferably a 32-bit bus including address, control, and data lines as is well known in the art. The central DMA controller 215 preferably comprises a modified eight-channel Legacy 8237 DMA controller, available from INTEL. The central DMA controller 215 is specially configured, in accordance with the teachings of the present invention, to include an additional output pin connected to a state machine 217 within the central DMA controller 215. The PCI-to-ISA bridge 210, also includes an interrupt controller, and specific hardware for an IBM compatible PC. The PCI-to-ISA bridge 210 is preferably constructed in accordance with the specifications laid out in the PCI related specifications available from PCI special interest group, N/SHS3-15A, 5200 N.E. Elam Young Parkway, Hillsboro, Oreg. 97124-6497. The PCI-to-ISA bridge 210 acts as an interface between the primary PCI bus 240 and an ISA bus 250. The ISA bus 250 is conventional and connects to, for example, a floppy disk controller, serial and parallel ports, a PCMCIA card, etc. (not shown).

The PCI bus 240 also communicates with a PC-card controller 220. The PC-card controller 220 also provides DMA capability and includes a state machine 222. A PCI video controller 230 also connects to the PCI bus 240.

The notebook computer 110 engages with the docking station 120 (also shown in FIG. 2 as enclosed within a dashed line) via a docking interface 255. The docking interface 255 preferably comprises an electrical connector which electrically connects the notebook computer 110 to the docking station 120. A PCI-to-PCI bridge 260 within the docking station 120 connects to the docking interface 255 to provide an interface between the primary PCI bus 240 within the notebook computer 110 and a secondary PCI bus 262 within the docking station 120. The PCI-to-PCI bridge 260 preferably includes a repeater as well as other connector and conventional interface circuitry to provide for error free communication between the primary PCI bus 240 and the secondary PCI bus 262. The PCI-to-PCI bridge 260 is preferably constructed in accordance with the specifications laid out in revision 1.0 of the PCI-to-PCI bridge architecture specification available from PCI special interest group, N/SHS3-15A, 5200 N.E. Elam Young Parkway, Hillsboro, Oreg. 97124-6497.

The secondary PCI bus 262 connects the PCI-to-PCI bridge 260 to PCI expansion slots 263, 266, as well as to a PCI-to-ISA bridge 270. The expansion slots 263, 266 are conventional expansion slots compatible with PCI bus configuration. The PCI-to-ISA bridge 270 is preferably constructed in accordance with the specifications laid out in the PCI architecture related specifications available from PCI special interest group, N/SHS3-15A, 5200 N.E. Elam Young Parkway, Hillsboro, Oreg. 97124-6497. The PCI-to-ISA bridge 270 communicates with a slave DMA controller 280 (e.g., a modified Legacy 8237 DMA controller available from INTEL). The slave DMA controller 280 is specially configured to include an additional output pin which connects to a state machine 282 within the slave DMA controller 280. Although the slave DMA controller 280 is depicted in FIG. 2 as separate from the PCI-to-ISA bridge 270, it should be understood that the slave DMA controller 280, with the state machine 282, are included within the PCI-to-ISA bridge 270 in accordance with the teachings of the present invention, and are not included in a "standard" PCI-to-ISA bridge.

The PCI-to-ISA bridge 270 also connects to conventional ISA expansion slots 283, 286 via an ISA bus 290 within the docking station 120. The ISA expansion slots 283, 286 respectively communicate with the slave DMA controller 280 via DMA request lines 292, 294.

In accordance with a feature of the present invention, the PC-card controller 220 within the notebook computer 110, as well as the slave DMA controller 280 (part of the PCI-to-ISA bridge 270) within the docking station 120, communicate with the PCI-to-ISA bridge 210 (which includes the central DMA controller) via slave DMA request lines 296, 298. As will be described in greater detail below, the new hardware connections provided between the slave DMA controllers 220, 280 and the central DMA controller 210 via the lines 296, 298, allow for complete compatibility between the central DMA controller 210 and the slave DMA controllers 220, 280.

In operation, the peripheral devices within the notebook computer 110 (e.g., the floppy disk controller, the serial and parallel ports, etc.) transmit data to and request data from the memory 205 via the central DMA controller 215 within the PCI-to-ISA bridge 210, and the primary PCI bus 240. As discussed briefly above, each of the peripheral units using DMA built into the notebook computer 110 are assigned a hardware configured channel which has corresponding memory address and control data stored within registers of the central DMA controller 215. Thus, when the central DMA controller 215 receives DMA requests from one of the peripheral units, the central DMA controller 215 accesses the memory 205 via the primary PCI bus 240 to transfer data from the peripheral unit to the memory 205 or data from the memory 205 to the requesting peripheral unit on the ISA bus 250.

When the notebook computer 110 is connected to the docking station 120 so that bi-directional communication is established between the notebook computer 110 and the docking station 120, I/O units connected at the PCI expansion slots 263, 266 communicate with the notebook computer 110 via the secondary PCI bus 262 and the PCI-to-PCI bridge 260. Specifically, the I/O units received by the PCI expansion slots 263, 266 can act as bus masters to transfer information to and from the memory 205 within the notebook computer 110 via the secondary PCI bus 262, the PCI-to-PCI bridge 260, and the primary PCI bus 240.

I/O units received within the ISA expansion slots 283, 286 are further configured to access data within the memory 205 of the notebook computer 110. However, if the I/O units within the expansion slots 283, 286 request DMA to the memory 205 (i.e., without mediation by the microprocessor and system controller 200), then the I/O units within the ISA expansion slots 283, 286 must operate through the slave DMA controller 280.

As detailed above, unless specially-adapted, highly-complex software is used to discriminate between each of the slave and central DMA controllers within the computer system 100 comprising the notebook computer 110 and the docking station 120, then the slave DMA controller 280 will not be configured for the appropriate channels so that the slave DMA controller will not be able to control memory accesses for I/O units assigned to those channels. In accordance with the teachings of the present invention, however, a special hardware implemented configuration provides a simple and efficient method by which the I/O units received by the ISA expansion slots 283, 286 may utilize DMA.

Specifically, the computer system 100 of the present invention includes the specially configured DMA controllers 215, 220 and 280 having the state machines 217, 222 and 282, respectively, which communicate via the lines 296, 298. As described in greater detail below with reference to FIGS. 3–6, the hardware implemented communication between the slave DMA controllers 220, 280 and the central DMA controller 215, as provided for by the state machines 217, 222 and 282, allow for proper configuration of slave DMA controllers within a distributed DMA system without complicated software.

Figure 3:
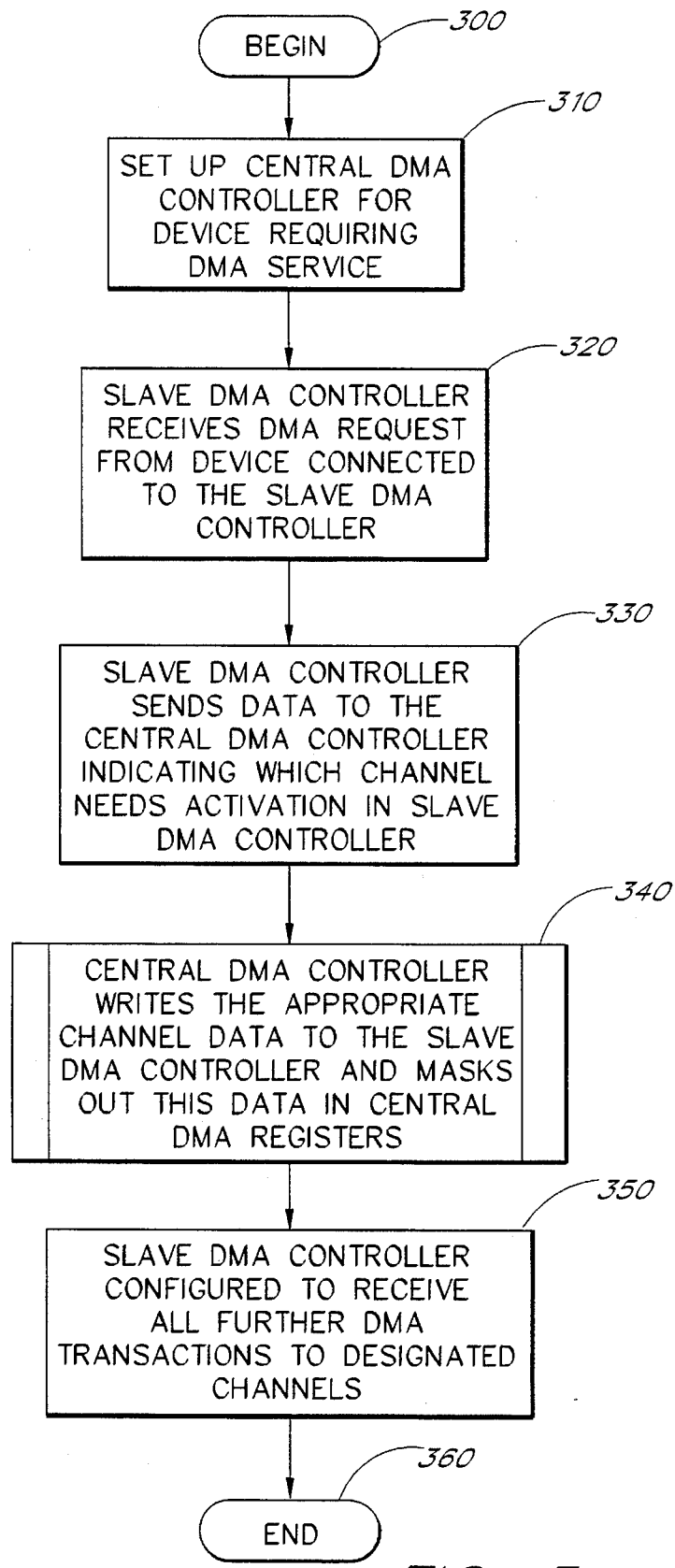
FIG. 3 is a flowchart which shows the general method of operation of the computer system depicted in FIGS. 1 and 2 when the notebook computer is engaged within the docking station.

FIG. 3 is a system flow chart which details the general method used in accordance with the present invention to provide direct memory access capability to I/O units connected to the ISA bus 290 without the use of a specially-adapted, highly-complex operating system software that is aware of this special hardware. The method starts, as represented by a "BEGIN" block 300, and proceeds to an activity block 310 wherein the central DMA controller 215 is initially set up by the conventional operating system software for devices requiring DMA service. Thus, as represented within the activity block 310, each of the I/O units having hardware configured channels are assigned to the central DMA controller 215 during the resource allocation method employed in the operating system (e.g., WINDOWS 95).

As is well known in the art, each DMA controller includes multiple registers which store information defining the channels assigned to the DMA controller. Typically, each channel assigned to a DMA controller is defined by data stored within a 6-bit mode register and four 16-bit registers which respectively hold a base address, a base count, a current address, and a current count. The base address is the starting address which is to be accessed in the memory, while the base count identifies the initial number of bytes which are to be transferred. The current address is the address which is currently being accessed by the DMA, while the current count is the number of bytes remaining to be transferred. The 6-bit mode register stores control information which is used to define the method of data transfer for a given channel.

Figure 7:
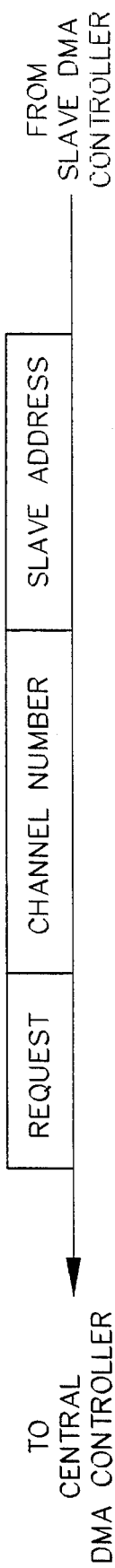
FIG. 7 illustrates the serial transmission between the slave DMA controller and the central DMA controller in FIGS. 3 and 5.

Once the central DMA controller 215 has been set up as indicated within the activity block 310 (i.e., the registers defining the channels assigned to the central DMA controller 215 have been loaded), a slave DMA controller (e.g., the slave DMA controller 280) receives a DMA request from a peripheral device connected within one of the ISA expansion slots 283, 286, as indicated within an activity block 320. As is well known in the art, whenever an I/O unit having DMA capability initiates a DMA request, the I/O unit transmits a DMA request to the local DMA controller. If the slave DMA controller 280 is not configured for the channel of the requesting I/O unit, then the state machine 282 within the slave DMA controller 280 causes the slave DMA controller 280 to transmit data, in a serial fashion, to the central DMA controller 215 via the line 298 (as indicated within an activity block 330). The serially transmitted data on the line 298 includes an initial request signal, data which indicates the channel which needs activation within the slave DMA controller 280, and the address of the requesting slave DMA controller as illustrated in FIG. 7.

Once the slave DMA controller 280 has transmitted the appropriate data to the central DMA controller 215, control passes to a sub-method block 340 wherein the central DMA controller 215, under the direction of the state machine 217, transfers the appropriate channel data, including the channel number, the base address and count data, and the data to be stored in the mode register, to the slave DMA controller 280. This channel data is transmitted to the slave DMA controller 280 via the primary PCI bus 240, the PCI-to-PCI bridge 260, the secondary PCI bus 262, and the PCI-to-ISA bridge 270. In addition, the central DMA controller masks out the corresponding channel accessing information stored in the registers of the central DMA controller 215 so that all further accesses to that channel are ignored by the central DMA controller 215. This insures that, after the channel data has been transferred to the slave DMA controller 280, there is no conflict between the master DMA controller 215 and the slave DMA controller 280 (i.e., only the slave DMA controller 280 responds to DMA control signals associated with that channel as well as further data written to that channel). The method employed within the sub-method block 340 to write and mask-out the appropriate channel data will be described in greater detail below with reference to FIG. 4.

Control passes from the sub-method block 340 to an activity block 350 wherein the slave DMA controller 280 is configured to receive all further DMA transactions to the designated channels. That is, all those channels from which the slave DMA controller 280 receives DMA requests are now assigned exclusively to the slave DMA controller 280. This reconfiguration, or remapping, of the slave DMA controller 280 is accomplished by storing the data transmitted from the central DMA controller 215 in the corresponding registers within the slave DMA controller 280. Thereafter, from the perspective of the system software, all updates (i.e., reads or writes) to or from the slave channel registers occur as though these updates were made to the central DMA controller registers. Thus, once the overall system method is complete and control passes to a final "END" block 360, the computer system 100 is configured to operate with multiple DMA controllers without interference.

Figure 4:
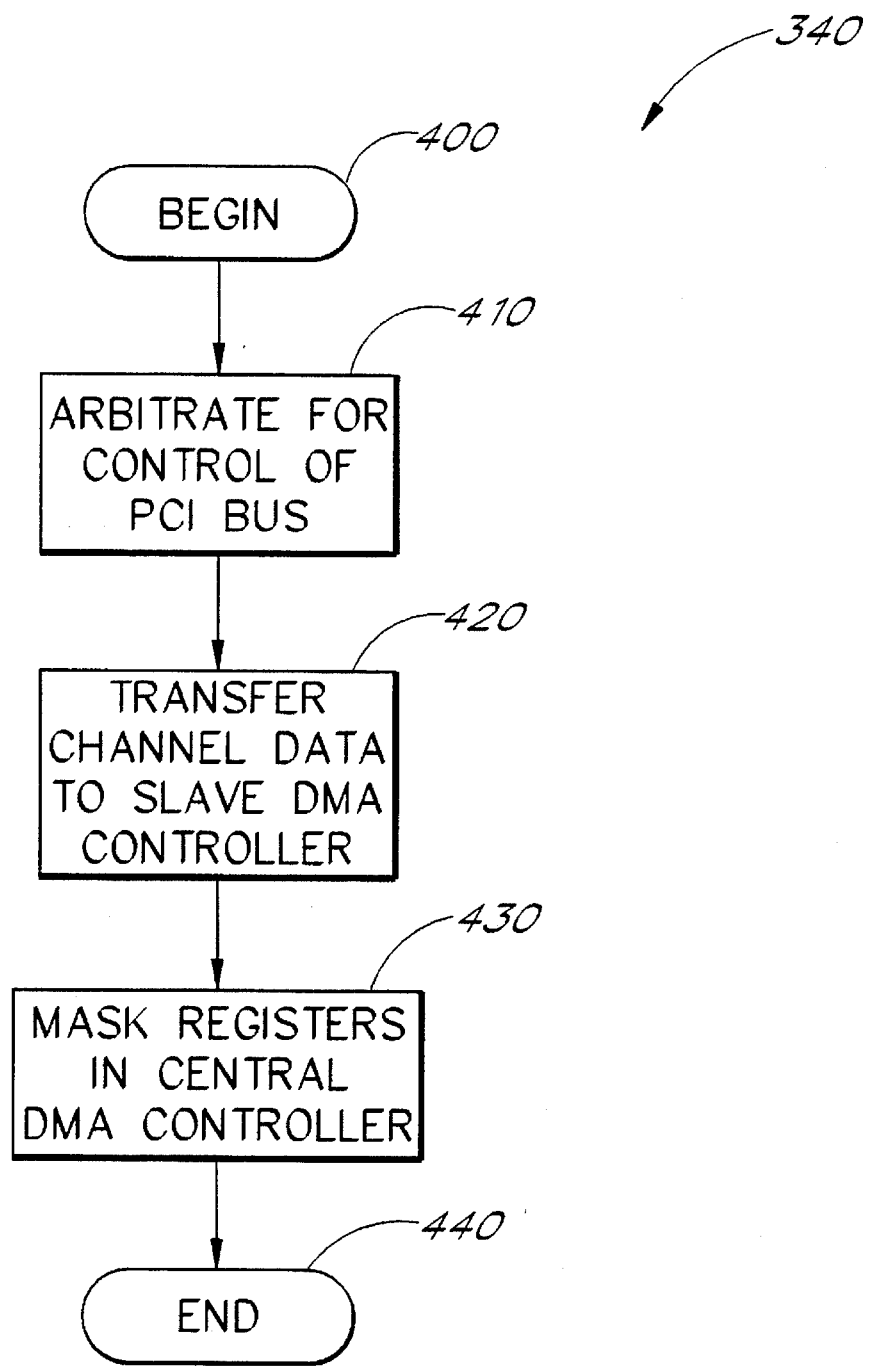
FIG. 4 is a flowchart which depicts the general method of transferring channel information from the central DMA controller to a slave DMA controller.

FIG. 4 is a flowchart which details the method employed in the sub-method block 340 to transfer data associated with a channel originally assigned to the central DMA controller 215 to the slave DMA controller 280. Thus, the method represented in the flow chart of FIG. 4 remaps channel data from the central DMA controller 215 to the slave DMA controller 280 so that the remapped channels are assigned to the slave DMA controller 280 and are no longer assigned to the central DMA controller 215.

The method starts, as represented by a "BEGIN" block 400, and proceeds to an activity block 410 wherein the central DMA controller 215 arbitrates to gain control of the bus. As is well known in the art, a DMA controller 215 is a bus master so that the DMA controller 215 is able to obtain control of the primary PCI bus 240. Once the central DMA controller 215 has obtained control of the PCI bus 240, the central DMA controller 215 initiates a data transfer cycle, as indicated in an activity block 420, to transfer channel data to the slave DMA controller 280. The registers within the slave DMA controller 280 have associated system addresses so that the central DMA controller 215 is able to simply write the data stored in the channel registers (i.e., the data to be transferred) to the addresses of the corresponding registers in the slave DMA controller 280. Thus, the transfer of the channel data from the central DMA controller 215 to the slave DMA controller 280 is performed in a conventional data transfer transaction along the PCI bus 240. The slave DMA controller channel address is subsequently remapped to the same address as the corresponding channel in the central DMA controller 215.

Once the appropriate channel data has been transferred to the slave DMA controller 280, control of the method passes to an activity block 430, wherein the channel associated with the data just transferred is masked (i.e., disabled) in a conventional manner using a mask register within the central DMA controller 215. Thereafter, the method terminates as represented by an "END" block 440.

Figure 5:
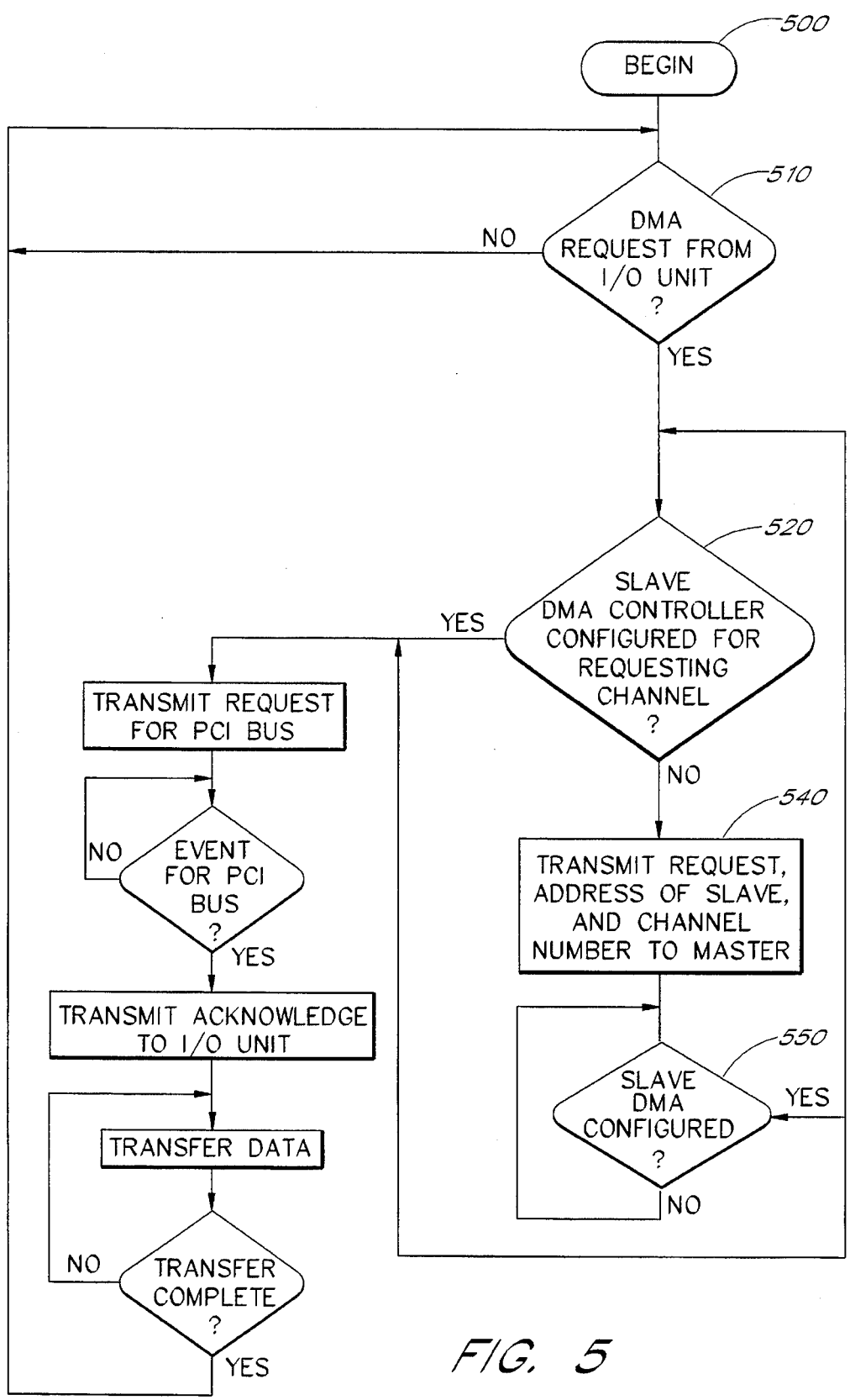
FIG. 5 is a flowchart which depicts the general method employed by the state machine within the slave DMA controller to initiate a channel data request to the central DMA controller.

FIG. 5 is a flowchart which depicts the general method employed by the state machine 282 within the slave DMA controller 280 (or the state machine 222 within the controller 220) to generate a channel request signal to the central DMA controller 215 in accordance with the present invention. The state machine 282 begins in an idle state represented by the "BEGIN" block 500, which is entered immediately after power-up or after a power reset. The state machine 282 remains in the idle state until a DMA request is received from one of the I/O units within the ISA slots 283, 286, as represented within a decision block 510. If a DMA request is received from one of the I/O units, then a test is performed within the state machine 282 to determine if the slave DMA controller 280 is configured for the requesting channel, as indicated within a decision block 520. If a slave DMA controller 280 is configured for the requesting channel (i.e., the hardware configure channel of the requesting I/O unit has corresponding channel data stored within the registers of the slave DMA controller 280), then the state machine 282 enters a memory transaction state (represented by activity blocks 520–535) wherein the slave DMA controller 280 first obtains control of the PCI bus 240 and subsequently transmits an acknowledge signal to the requesting I/O unit and begins the memory access in a conventional manner. Specifically, the slave controller 280 transmits a bus request, as indicated within an activity block 525, and waits for an acknowledge that the PCI bus 240 has been granted to the control of the slave DMA controller 280, as represented in a decision block 527. Once control of the PCI bus 240 has been granted to the slave DMA controller 280, the slave DMA controller transmits an acknowledge signal to the requesting I/O unit, as indicated within an activity block 530. The data is then transferred in a conventional manner, as represented in an activity block 533, and control passes to a decision block 535, wherein a determination is made if the data transfer is complete. If multiple cycles of data are to be transferred, then control returns to the activity block 533 until all of the data is transferred, at which time control returns to the idle state where the slave DMA controller waits for another DMA request.

If, however, it is determined within the decision block 520 that the slave DMA controller 280 is not configured for the requesting channel, then the state machine 282 enters a request channel state (represented by an activity block 540), wherein the state machine 282 transmits a request signal together with the requesting channel number and the address of the slave DMA controller 280 to the central DMA controller 215. The data transmitted from the state machine 282 to the central DMA controller 215 is transmitted in a serial manner, as illustrated in FIG. 7. Once the appropriate data has been transmitted from the state machine 282 to the central DMA controller 215, control passes to a decision block 550 wherein the state machine 282 determines whether or not the slave DMA controller 280 has received the necessary channel data to be configured for the requesting channel. This process repeats until the slave DMA controller 280 receives the necessary channel information from the central DMA controller 215, as described above. Control then passes from the decision block 550 to the activity block 525 where a request is issued to obtain control of the PCI bus 140. Thus, as represented in the flowchart of FIG. 5, the configuration data is advantageously transferred to the slave DMA controller 280 in time for the slave DMA controller 280 to respond to the DMA request from the I/O unit. This prevents the I/O unit from having to retry a DMA request at a later time so that there is no significant interruption of service observed by the I/O unit.

Figure 6:
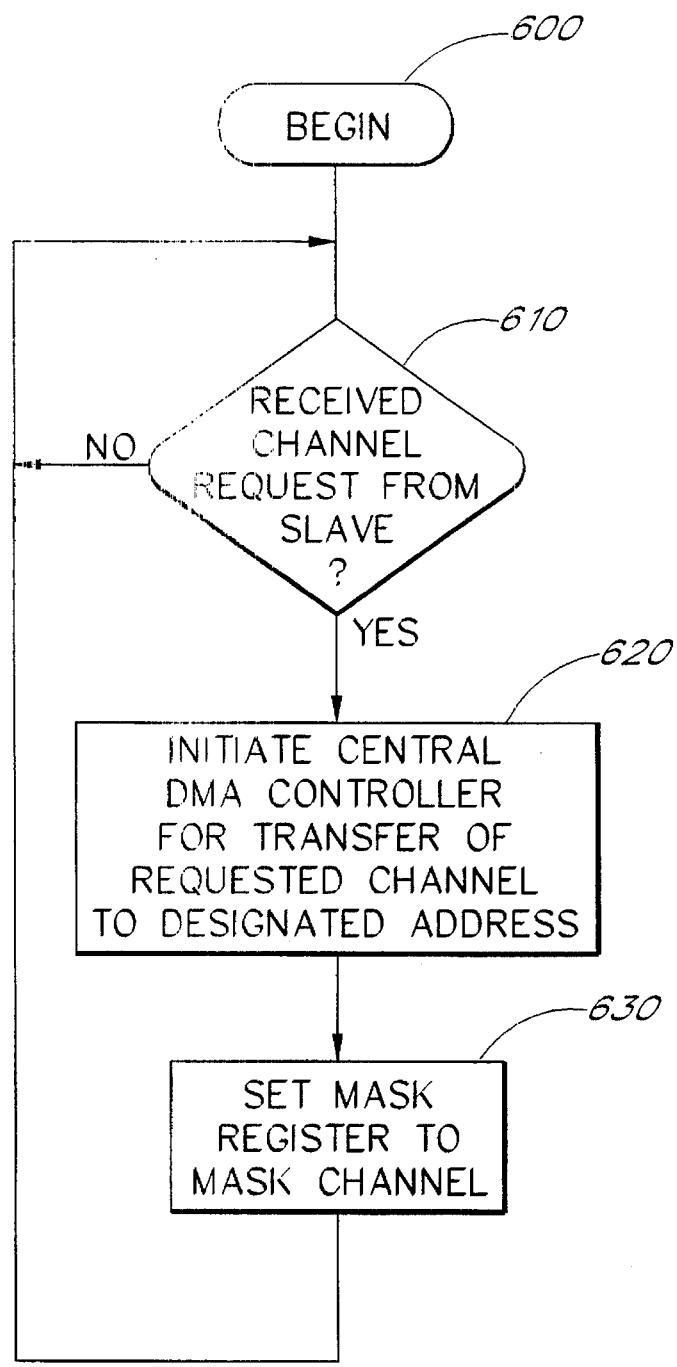
FIG. 6 is a flowchart which depicts the general method employed by the state machine within the central DMA controller to initiate a channel data transfer upon receipt of a channel data request from the slave DMA controller.

FIG. 6 is a flowchart which illustrates the general method employed by the state machine 217 within the central DMA controller 215 when the central DMA controller 215 receives a channel request from the slave DMA controller 280. The state machine 217 begins in an idle state, represented by a BEGIN block 600, which is entered upon power-up or a power reset. The state machine 217 remains in the idle state until a channel request is received from the slave DMA controller 280, as indicated within a decision block 610. When the channel request is received from the slave DMA controller 280, the state machine 217 enters a state represented by an activity block 620 wherein the central DMA controller 215 is initiated for transfer of the requested channel information to the designated address of the slave DMA controller 280. This initiation of the central DMA controller 215 includes the process of loading the designated address into the appropriate register of the central DMA controller 215, as well as loading the information corresponding to the requested channel into registers for transfer out along the PCI bus 240. The state machine 217 subsequently enters a set mask state, wherein the state machine 217 sets the data within the mask register (not shown) to cause the requested channel to be disabled within the central DMA controller 215. The state machine 217 then enters the idle state until another channel request is received from a slave DMA controller.

Although the preferred embodiment has been described and illustrated above, those skilled in the art will appreciate that various changes and modifications do not depart from the spirit or essence of the invention. Accordingly, the scope of the present invention is limited only by the language of the following appended claims.

What is claimed is:

1. A microprocessor-based computer system which provides distributed direct memory access (DMA) for a plurality of peripheral units, said computer system comprising:

a memory;

a central DMA controller in communication with said memory via a system bus, said central DMA controller including registers which store data defining a communication channel associated with one of said peripheral units;

a slave DMA controller in communication with said memory and said central DMA controller via said system bus, said slave DMA controller including registers for storing data defining said communication channel;

a plurality of said peripheral units configured to access said memory, some of said peripheral units in communication with said memory via said central DMA controller and others of said peripheral units in communication with said memory via said slave DMA controller, said peripheral units further configured to include an assigned communication channel; and a hardware connection between said slave DMA controller and said central DMA controller which allows said slave DMA controller to request channel information in said registers within said central DMA controller when one of said peripheral units in communication with said memory via said slave DMA controller initiates a memory access.

2. A computer system as defined in claim 1, wherein said slave DMA controller includes a state machine which initiates said request of channel information, and wherein said central DMA controller includes a state machine which receives said request of channel information and initiates transfer of said channel information to said slave DMA controller.

3. A method of automatically controlling distributed direct memory accesses (DMAs) in a distributed DMA computer system including a memory, a central DMA controller, a slave DMA controller, and a plurality of peripheral units, said peripheral units having hardware configured channel data defining communication channels associated with each of said peripheral units, said method including the steps of:

configuring said central DMA controller to control direct memory accesses initiated by said peripheral units by storing information in said central DMA controller corresponding to said hardware configured channel data within said peripheral units;

initiating a DMA request from one of said peripheral units to said slave controller;

requesting, from said central DMA controller, channel data corresponding to a communication channel associated with said one of said peripheral units; and transferring said channel data corresponding to said communication channel associated with said one of said peripheral units from said central DMA controller to said slave DMA controller.

4. A method of automatically controlling distributed direct memory accesses (DMAs) in a distributed DMA computer system including a memory, a central DMA controller, a slave DMA controller, and a plurality of peripheral units, said peripheral units having hardware configured channel data defining communication channels associated with each of said peripheral units, said method including the steps of:

configuring said central DMA controller to control direct memory accesses initiated by said peripheral units by storing information in said central DMA controller corresponding to said hardware configured channel data within said peripheral units;

initiating a DMA request from one of said peripheral units to said slave controller;

requesting, from said central DMA controller, channel data corresponding to a communication channel associated with said one of said peripheral units;

transferring said channel data corresponding to said communication channel associated with said one of said peripheral units from said central DMA controller to said slave DMA controller; and masking said channel data corresponding to said communication channel so that said central DMA controller is no longer enabled to control DMA accesses initiated by said peripheral unit associated with said communication channel.

5. A method as defined in claim 3, further comprising the step of acknowledging said DMA request and controlling memory transfer between said requesting peripheral unit and said memory.

6. A computer system for automatically controlling direct memory accesses (DMAs) comprising:

a microprocessor;

a memory under the control of said microprocessor;

a system bus;

a central DMA controller in communication with said memory via said system bus, said central DMA controller storing configuration information which provides for control of direct accesses to said memory for selected devices in communication with said system bus;

a slave DMA controller in communication with said system bus, said slave DMA controller also in communication with said central DMA controller via another hardware connection, and wherein said hardware connection provides data to said central DMA controller which designates selected portions of said configuration information which are to be transferred to said slave DMA controller; and a peripheral unit in communication with said memory via said slave DMA controller and said system bus.

7. A computer system for automatically controlling direct memory accesses (DMAs) comprising:

a notebook computer comprising:
  a microprocessor;
  a memory under the control of said microprocessor;
  a system bus;
  a central DMA controller in communication with said memory via said system bus, said central DMA controller storing configuration information which provides for control of direct accesses to said memory for selected devices in communication with said system bus; and
  a peripheral unit which accesses said memory via said central DMA controller;

and a docking station which communicates with said notebook computer via a connector, said docking station comprising:
  a slave DMA controller in communication with said system bus via said connector, said slave DMA controller also in communication with said central DMA controller via a hardware connection, and wherein said hardware connection provides data to said central DMA controller which designates selected portions of said configuration information which is to be transferred to said slave DMA controller; and
  a peripheral unit in communication with said memory via said slave DMA controller and said system bus.

* * * * *